Patented Apr. 12, 1927.

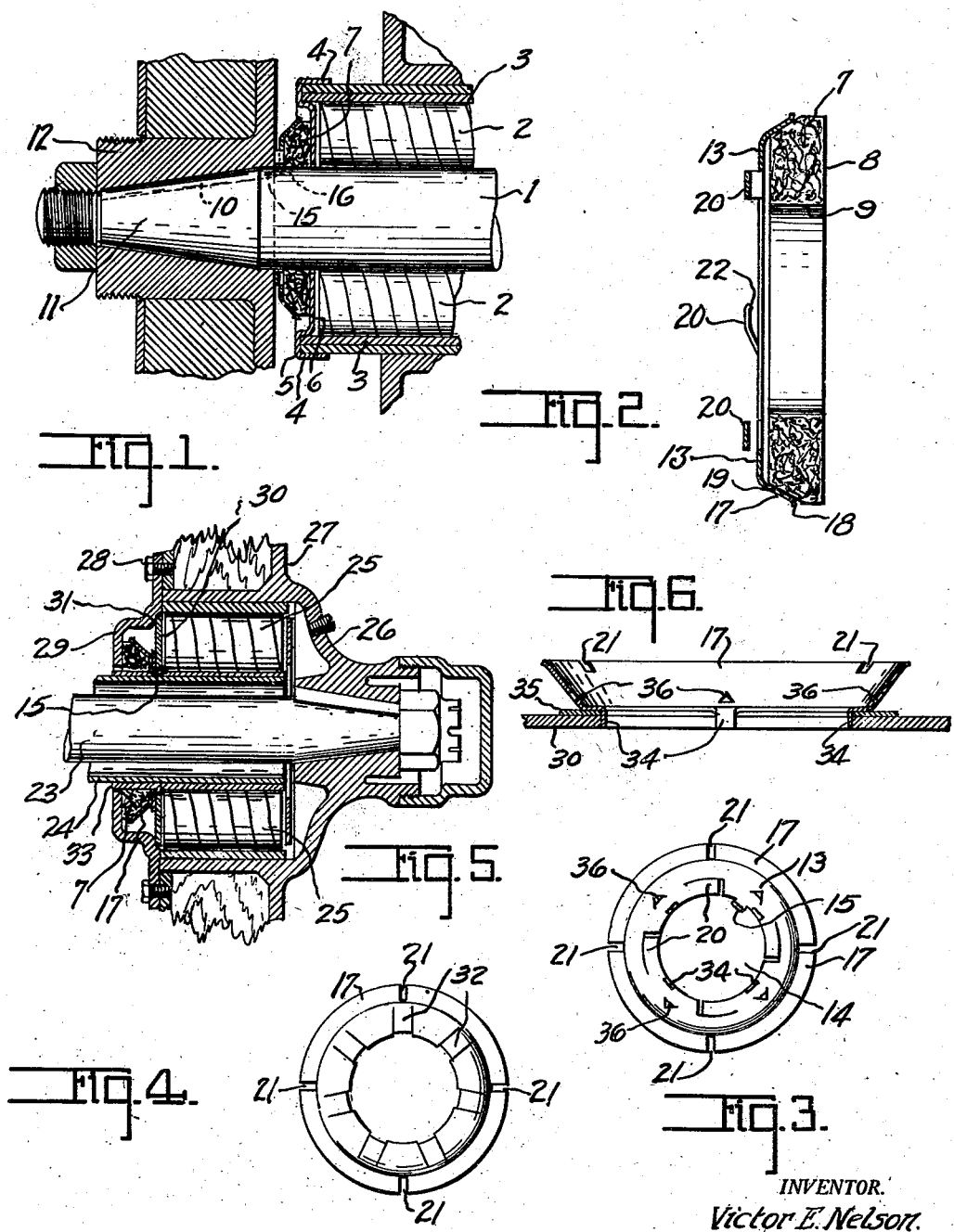

1,624,671

UNITED STATES PATENT OFFICE.

VICTOR E. NELSON, OF REDFORD, MICHIGAN.

PACKING RING.

Application filed April 27, 1921. Serial No. 464,845.

This invention relates to packing rings and the object of the invention is to provide a packing ring which is contractable about a shaft to prevent oil leakage along the shaft. Another object of the invention is to provide a packing ring for use in prevention of leakage of oil or grease about bearings, rods, shafts and other rotating members. This packing is excellently adapted for use between the rear axle housing and rear wheel of an automobile to prevent oil or grease from leaking from the differential through the housing and bearing therein or to prevent leakage of oil or grease from the bearing itself. Heretofore, it has been the usual custom to utilize a felt washer in this connection but should there by any play of the shaft in the bearing therefor the opening in the washer is enlarged so that oil may easily pass between the shaft and inner face of the washer. Should the felt washer be secured to rotate with the wheel and shaft and ride against the face of the bearing, the face thereof becomes quickly worn and allows oil leakage and should there be a slight end play in the shaft the washer is not held in continuous contact with the face of the bearing so that oil leakage will occur. The principal object of this invention is, therefore, to provide a packing ring which, at all times, is automatically held in packing position independent of any end play of the shaft, the said ring when so assembled being inherently contractable about the shaft thus preventing oil leakage along the shaft. A further object of the invention is to provide a packing ring consisting of an inner semi-flexible packing member and an outer spring metal ring adapted when assembled in proper relation to contract the semi-flexible member on the shaft and force the same longitudinally into continuous contact with a bearing face and thereby prevent leakage of oil between the bearing face and abutting face of the semi-flexible member. These objects and the several novel features of the invention are hereinafter more fully described and claimed and the preferred form of construction by which these objects are attained is shown in the accompanying drawings in which—

Fig. 1 is a section through a rear axle bearing, shaft and wheel hub showing my improved packing ring assembled in proper relation therewith.

Fig. 2 is an enlarged section through the packing ring.

Fig. 3 is a plan view of the spring metal portion of the packing ring.

Fig. 4 is a plan view of an alternative type of spring metal member.

Fig. 5 is a section showing the assembly of the packing ring on a full floating type of axle.

Fig. 6 is a section showing the unit assembly of the packing ring before assembly on the full floating type of axle.

As shown in Fig. 1 a shaft 1 is provided which is rotatable in the bearings 2 placed in the end of a rear axle housing 3. An end cap 4 is provided for the rear axle housing having an annular shoulder or raised portion 5 fitting over the end of the housing, the central portion 6 being depressed so that when the cap is driven onto the axle housing by striking the shoulder 5 the face of the portion 6 is not marred. A semi-flexible packing 7 is provided about the shaft 1, as shown in Fig. 1, and is formed of compressed cork or other material suitable for the purpose. This annular packing member 7 is provided with a face 8 shown in Fig. 2, adapted to engage the face of the portion 6 of the end cap 4, the packing member 7 also having an annular inner face 9 fitting tightly about the shaft 1. A keyway 10 is provided in the tapered end 11 of the shaft and a wheel hub 12 is keyed to the said shaft. A spring metal packing ring 13 is provided, as shown in Figs. 2 and 3, having a central aperture 14 adapted to fit loosely about the shaft, a lug 15 on the ring extending into the aperture 14 and being adapted to engage in the end 16 of the keyway 10. The spring metal ring 13 is provided with a beveled flange 17, as shown in Fig. 2, which is turned outwardly at the inner edge 18 to prevent the same from cutting into the semi-flexible packing 7. A series of spring members 20 are struck up out of the metal about the central aperture 14 and are positioned in circular alignment and a series of notches 21 may be cut into the flange 17 so that the said flange may spread to some extent on the beveled face of the member 7. The spring members 20, as shown more particularly in Fig. 2, are turned over slightly at 22 so as not to catch in the face of the wheel hub riding in contact therewith. The spring metal ring 13 is assembled over the packing member 7 in the manner shown in Fig. 2 and the assembled device is slipped over the end of the shaft 1 until the inner face 8 of the packing ring engages the outer face of the depressed portion 6 of the cap. In thus assembling the device the lug 15 is positioned in the end 16 of the keyway 10 to prevent rotation of the packing in relation to the shaft. The hub 12 is then secured on the end 11 of the shaft 1 with the face thereon engaging and compressing the spring lugs 20 of the spring metal ring 13. This tension on the spring lugs 20 holds the face 8 of the packing in tight contact with the face of the portion 6 of the cap 4 and effectually packs the rear axle against leakage of oil therebetween. The central aperture through the packing member 7 is of slightly smaller diameter than the shaft so that the packing member 7 is a press fit on the shaft, the face 9 of the packing engaging tightly against the shaft at all points and due to the member 13 being provided with a lug 15 engaging the keyway in the shaft the member 13 and packing member 7 are secured to the shaft and rotate therewith. In the form shown in Fig. 1 the stationary member is the end cap 4 relative to which the packing ring has rotative and lateral movement and the same effect is secured in the construction shown in Fig. 5 in which the packing ring is secured to a stationary member 33 and the packing face of the ring engages the rotating element 29 which may float relative thereto. This packing will also take up end play of the shaft by means of the spring lugs 20 which at all times tend to press against the inner face of the wheel hub and force the face 8 of the packing member 7 into engagement with the face 6 of the cap 4.

In Fig. 5 a full floating type of rear axle is shown the axle 23 being rotatable in the housing 24. The housing 24 is stationary and a bushing 33 is provided thereabout on which roller bearings 25 are adapted to rotate, a portion of the hub 26 being keyed to the axle end and a portion 27 of the hub riding on the roller bearings and supporting the wheel spokes. Secured to the portion 27 by cap screws 28 is a flanged member 29 which is provided with an aperture at the center slightly greater than the diameter of the bushing 33. One method of packing this type of axle is to position the packing ring as shown in Fig. 2 in the recess of the flange member 29 as is indicated in Fig. 5 with the face 8 of the packing ring engaging the corresponding face of the member 29. The spring metal ring for this type of packing is provided with a series of outwardly extending lugs 34 about the central aperture adapted to fit within the disc 30 and the fiber disc 35 between the ring and disc 30. A disc 30 is provided having a central aperture also adapted to engage over the said lugs, the disc 30 being seated in the annular shoulder 31 of the member 29, it being necessary to compress the lugs 20 to some extent in order to seat the member 30. This member 30 may be welded in the shoulder 31 of the member 29 providing a cage which thus encloses the packing ring and by means of the lugs 34 engaging the edges of the aperture in the member 30, the packing ring is held centrally in the said member. When the parts are welded as stated, they may be handled as a unit consisting of the flanged member 29, apertured disc 30 and packing ring. The assembled unit may be positioned over the bushing 33, shown in Fig. 5, the lug 15 on the spring metal ring engaging a small keyway or notch in the bushing 33. This lug 15 is rounded so that it may be easily moved into or out of the notch or keyway therefore and when in the keyway the packing ring is prevented from rotation in relation to the bushing. When the device has been thus assembled it will be noted that the packing ring is held from rotation by the lug 15 and, if desired, as shown in Fig. 3 a series of points 36 may be struck inwardly from the spring metal member 13 which are adapted to engage the cork packing ring 7 when assembled therewith and prevent rotation of the member 7 in relation to the spring metal ring. It will be noted from Fig. 5 that the flanged member 29 and apertured disc 30 are adapted to rotate about the packing ring with the wheel hub. Due to the compression of the members 20 which are compressed in Figs. 1 and 5, the face 8 of the cork gasket 7 is held in contact with the corresponding face of the member 29 and the fiber member 35 takes up the wear caused by rotation of the apertured disc 30 thereagainst and prevents the lugs 20 from engaging the member 30 and becoming worn. It will be noted that, in the form shown in Fig. 2, as the cup shaped spring metal member 13 is forced over the cork gasket 7 the spring metal member tends to contract the cork gasket and hold the face 9 thereof in tight engagement with the shaft or bushing with which it is used. As previously stated, the cork member preferably fits the shaft but, by compressing the same with the spring metal member, such tight fit is insured and inaccuracies in workmanship compensated for. In Fig. 4 I have illustrated an alternative type of spring metal ring in which the struck up spring lugs 32 are radially positioned the remainder of the ring being similar to that shown in Fig. 3. The action of this ring is similar to that of the ring 13 shown in the remaining figures but due to the lugs 32 being somewhat shorter and not extending as high as the lugs 20 this ring is not so well adapted to take up end play as the type shown in Fig. 1. It is to be noted that both types of rings tend to contract the packing to some extent and as the same time tend to force the packing endways when pressure is applied so that at all times the faces 8 and 9 of the packing prevent leakage of oil.

From the foregoing description it becomes evident that the device is very efficient in operation, of simple construction and consequent low manufacturing cost, is easily assembled, and provides a device which accomplishes the objects described.

Having thus fully described my invention, its utility and mode of operation, what I claim and desire to secure by Letters Patent of the United States is—

1. A lubricant retainer for bearings for a rotating member, comprising the combination therewith of a cap at one end of the bearing through which the rotating member extends and relative to which the rotating member may have lateral movement, a packing ring tightly fitting the rotating member, means for causing the packing ring to rotate with the rotating member, means for exerting a yielding pressure on the ring longitudinally of the rotating member to maintain the ring in packing engagement with the cap, and an abutment for the pressure exerting means, the arrangement of the parts permitting lateral motion between the packing ring and the cap.

2. In packing for preventing oil leakage about a shaft, the combination of a cork ring having a beveled face and a spring metal ring having a flange engaging the said beveled face, a series of lugs struck up from the spring metal ring, a member against which the cork ring is adapted to engage, and a member against which the spring lugs are adapted to press, the cork ring and spring metal ring being secured together.

3. In a packing for rods, shafts or the like, a bearing for the shaft, a cap enclosing the bearing, a cork ring having a flat face engaging the said cap and having a beveled face on the opposite side, a spring metal cup shaped member engaging the said beveled face and secured to the shaft, a member on the shaft and means between the said member and cup shaped member yieldably forcing the cork ring into engagement with the cap.

4. In a packing for rods, shafts or the like, a bearing, a cap for the bearing positioned about the shaft, a flexible packing member fitting the shaft and provided with a beveled face, a cup shaped spring metal member secured to the shaft and fitting the said beveled face, a series of spring lugs struck up from the cup shaped member, and a member secured to the shaft against which the spring lugs are adapted to press.

5. In a packing for rods, shafts or the like, a bearing, a cap for the bearing, a semi-flexible packing member provided with a beveled face, a cup shaped spring metal member fitting the said beveled face, means preventing rotation of the semi-flexible member in relation to the cup shaped member, a series of spring lugs struck up from the cup shaped member, and a member secured to rotate with the shaft in a manner to compress the semi-flexible packing member and cup shaped member between the said member and the said cap.

6. In a fluid retainer for bearings for a rotating member, a packing ring of yieldable material rotating with the rotating member, a chambered cap for the packing ring, the diameter of which is greater than the diameter of the packing ring to permit the packing ring to move laterally in all directions with the rotating member, and means for yieldably holding the packing ring in contact with a wall of the chambered cap.

7. A packing for shafts, rods or the like, comprising a bearing, a cap enclosing the end of the bearing, a member secured to rotate with the shaft in spaced relation with the cap, a cork ring between the cap and said member and provided with a coned face, a cup shaped member having a yieldable flange coextensive with the coned face of the cork ring, and yieldable means tending to move the cork ring longitudinally of its axis.

8. In a packing for rods, shafts or the like, a housing for the shaft, a bearing for the shaft within the housing, a cap provided with a flange fitting over the end of the housing and having a central recess and a central aperture for the shaft, a cork ring having a flat face engaging the recessed portion of the cap, a spring metal cup shaped member engaging over the said cork ring and secured to the shaft, and means for holding the cup shaped member in engagement with the cork ring.

9. A lubricant retainer for bearings for rotating shafts comprising the combination with the bearing and the shaft, of a detachable member stationarily mounted relative to the bearing and providing an end closure therefor, said detachable member having a central aperture greater in diameter than the shaft and through which the shaft extends and in which it may have lateral movement, a packing ring of integral form and yieldable material mounted on the shaft and movable therewith, and spring means acting to compress the same radially to cause engagement thereof with the shaft and simultaneously move the same longitudinally of the shaft to engage the detachable member.

In testimony whereof, I sign this specification.

VICTOR E. NELSON.